Aug. 21, 1928.

M. J. LYONS

TIRE FILLER

Filed April 28, 1927

1,681,357

WITNESSES:

INVENTOR:
Michael J. Lyons,
BY
Joshua R. H. Potts
ATTORNEY

Patented Aug. 21, 1928.

1,681,357

UNITED STATES PATENT OFFICE.

MICHAEL J. LYONS, OF PHILADELPHIA, PENNSYLVANIA.

TIRE FILLER.

Application filed April 28, 1927. Serial No. 187,149.

My invention relates to tires for motor vehicles and more particularly to a structure adapted to replace the inner tube ordinarily employed in pneumatic tires.

The inner tubes of pneumatic tires cause a great deal of trouble and inconvenience due to punctures, leakage of air, and deterioration of the rubber of which they are composed and the object of my invention is to provide a structure which may replace such inner tubes, be both puncture-proof and not affected by bruises which shorten the life of the ordinary inner tube, and having sufficient resiliency to absorb road shocks and vibrations.

Figure 1:
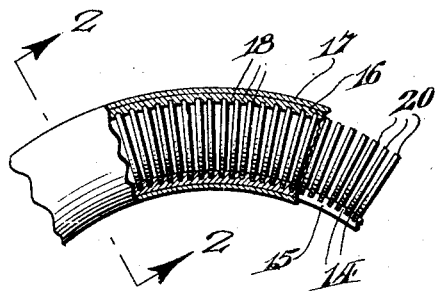

This object, and other advantageous ends which will be described hereinafter, I attain in the following manner, reference being had to the accompanying drawings in which Figure 1 is a side view of a fragment of a tire filler embodying my invention, sections of which have been broken away in order to show certain features of construction, and Figure 2 a cross-sectional view taken on line 2—2 on Figure 1.

Figure 2:
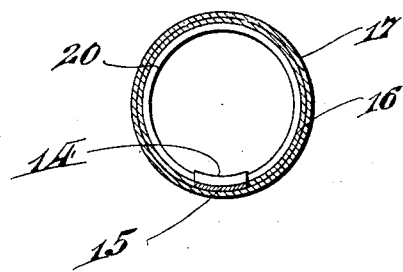

Referring to the drawing, an annular metal band 15, which is preferably curved in cross-section as shown in Figure 2, has a series of spaced tongues 14 formed or secured upon its periphery. A series of resilient rings 20 are secured to the band and spaced from one another by the tongues.

A layer of fabric 16 is shaped over the rings and forms a filler of a thickness approximately corresponding to the thickness of band 15. A second layer of fabric 17 is formed or wound over fabric 16 to hold same in place and both layers 16 and 17 of the fabric are thoroughly impregnated with an elastic compound, such as rubber. Fabric 17 is attached with sufficient pressure to force ridges 18 between the rings and thus tend to keep them separated from one another. While two layers of fabric have been shown, as many layers as is desired may be employed and the fabric may be composed of either cloth or wire mesh.

With a device made in this manner, rings 20 will react to and cushion any blows received by the casing in which it is installed in much the same manner as does a pneumatic tube, and it is evident that anything piercing the casing would have little effect on the structure of my device and would in no way impair its usefulness. The device may be inserted in a casing in the same manner as is a pneumatic tube.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:

1. A filler for motor vehicle tires including an annular metallic band, tongues on the band, and resilient rings secured between the tongues.

2. A filler for motor vehicle tires including an annular metallic band, tongues on the band, resilient rings secured between the tongues, and a flexible covering over the rings.

3. A filler for motor vehicle tires including an annular metallic band, tongues on the bands, resilient rings secured between the tongues, a flexible covering over the rings, and ridges formed in the covering and extending between the rings.

4. A filler for vehicle tires including an annular metallic band, tongues on the band, a plurality of substantially annular resilient loops, each of which is secured between adjacent tongues, a filler of fabric of substantially the same thickness as the band disposed on the outside of the loops, and an outer layer of fabric covering the filler fabric and band.

5. A filler for vehicle tires including an annular metallic band, tongues on the band, a plurality of substantially annular resilient loops, each of which is secured between adjacent tongues, a filler of fabric enclosing the loops and having inwardly extending ridges adapted to hold the loops in spaced relation.

6. A filler for vehicle tires including an annular band; tongues on the band; a plurality of annular resilient loops each secured between adjacent tongues; a filler of fabric enclosing the loops and having inwardly extending ridges adapted to hold the loops in spaced relation, and an outer layer of fabric enclosing the first layer.

In testimony whereof I have signed my name to this specification.

MICHAEL J. LYONS.